2,520,650

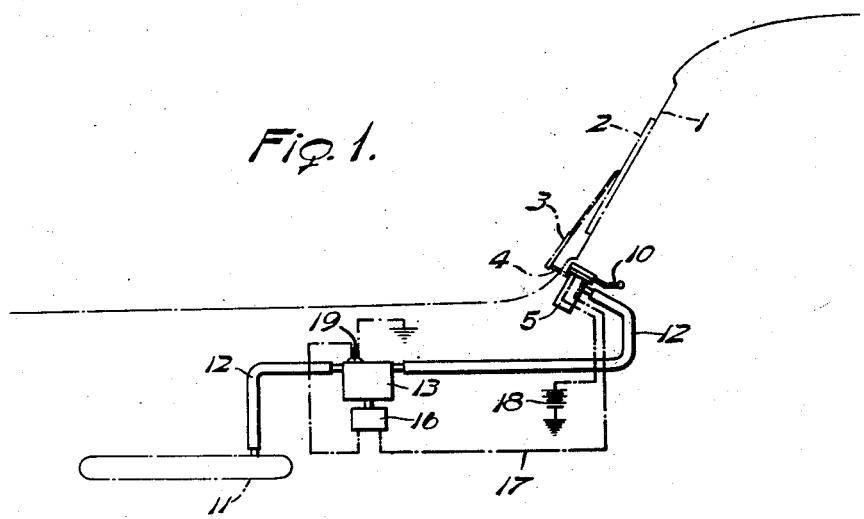
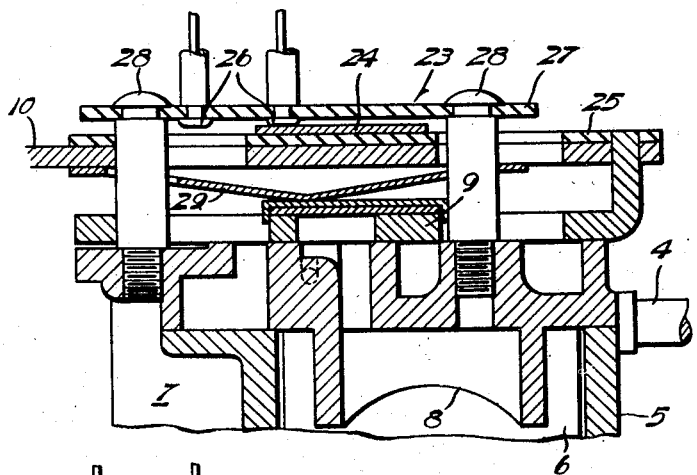
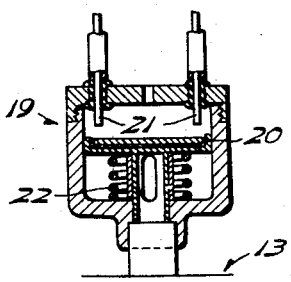

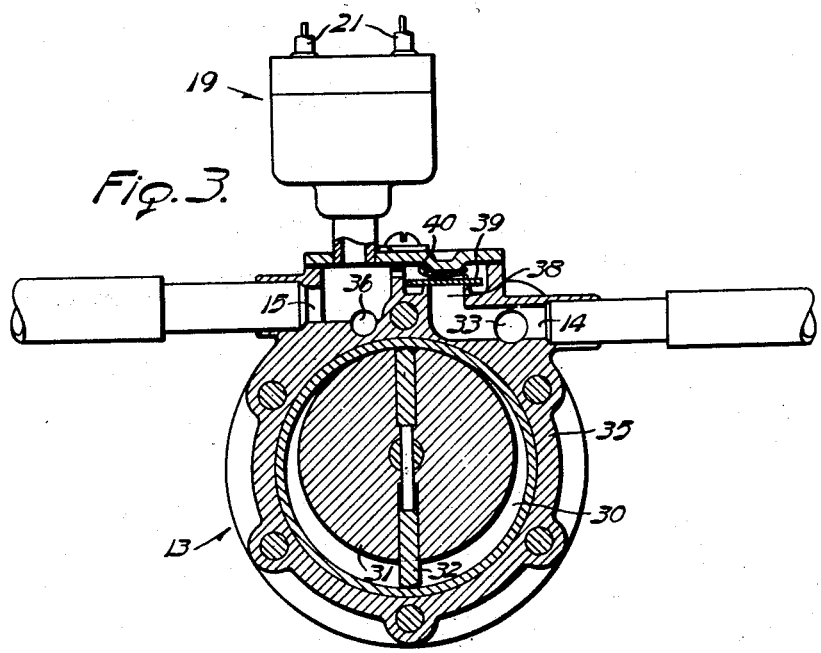
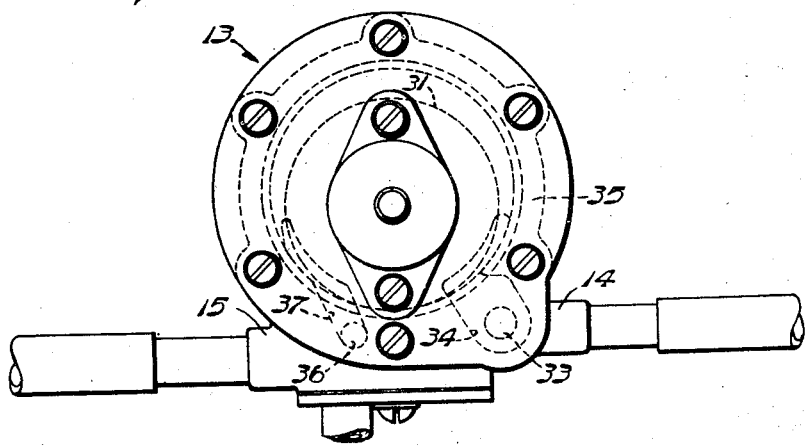
INVENTORS
John R. Oishei and Anton Rappl
BY
Beau, Brooke, Buckley & Beau.
ATTORNEYS Patented Aug. 29, 1950

UNITED STATES PATENT OFFICE 2,520,650

ACCESSORY SYSTEM OPERABLE FROM A FLUCTUATING PRESSURE SOURCE WITH A NORMALLY BY-PASSED SECONDARY SOURCE

John R. Oishei, Buffalo, and Anton Rappl, Eggertsville, N. Y., assignors to Trico Products Corporation, Buffalo, N. Y.

Application March 8, 1947, Serial No. 733,274

6 Claims. (Cl. 60—60)

This invention relates to a motor vehicle windshield cleaner system and especially to the fluid pressure type which is operated off the intake manifold of the vehicle engine as a source of negative pressure. When the present day windshield cleaner relies upon the intake manifold alone for its suction supply the cleaner will slow down during periods of engine operation in which the throttle is wide open. This results in poor visibility and is a hazard against safe driving.

The primary object of the present invention is to improve the operation of the windshield and to render it uniform. Again, the object of the invention is to provide a reliable and better performance of the cleaning system.

It has heretofore been proposed to supplement the manifold supply of the suction with an auxiliary supply as furnished by a part-time pump. Such pump has been of the reciprocatory plunger type, with the manifold pulling air from the accessory through the pump chamber when pump operation is not required for accessory functioning.

The rotary type of pump, wherein a rotary bladed impeller revolves in a chamber, has certain advantages over the rectilinear type. However, the presence of the impeller blades obstructs air movement through the impeller chamber when the pump is at rest. With the present invention it is possible to use the rotary pump in a system of the kind contemplated. It is, therefore, a further object of the invention to provide a windshield cleaner system which is highly efficient and practical.

The foregoing and other objects will manifest themselves as the following description progresses with reference to the accompanying drawings wherein:

Fig. 1 is a diagrammatic view showing the improved system;

Fig. 2 is an elevation of a rotary type pump incorporated therein;

Fig. 3 is a cross-sectional view through the pump;

Fig. 4 is a sectional view of the system control, with the windshield cleaner motor in fragment; and Fig. 5 is a sectional view of a pressure switch employed.

Referring more particularly to the accompanying drawings, the numeral 1 designates the windshield of a motor vehicle, 2 the wiper of the windshield cleaner, 3 the wiper actuating arm, and 4 the arm actuating shaft which may also constitute the shaft of the cleaner motor 5. Fixed to the shaft 4 within the motor chamber is a piston-like vane 6 which oscillates therein as the pressure differential is timely reversed by automatic valve mechanism 7 and is ultimately held arrested against a seat 8 when the control valve 9 is moved by its handle 10 to park the wiper. All of this is more clearly depicted in an earlier Patent No. 1,978,634, the cleaner motor being connected to the intake manifold 11 of the vehicle engine by a conduit 12.

As an alternate source of suction supply there is provided a pump 13 which is interposed in the suction line 12 by having its inlet 14 connected to the cleaner motor and its outlet 15 joined to the intake manifold. The pump is designed to be driven by an electric motor 16 which is connected by wiring 17 in circuit with a source of electrical energy 18 and also with a pressure responsive switch 19. This switch is connected into the suction line 12 between the manifold and the pump for closing the pump circuit whenever the manifold pressure becomes deficient. To this end it may comprise simply a contact plate 20 urged by a spring 22 to a position for bridging the spaced contacts 21 but adapted to be withdrawn from such circuit closing position by the manifold suction when the latter is sufficient for practical cleaner operation. To facilitate its installation the pressure switch may be carried by the pump for being mounted as a unit therewith. The cleaner system is conditioned for this pressure maintaining operation by a manual switch 23 which preferably is closed concurrently with the turning on of the cleaner motor. Thus, a switch contact plate 24 is fixed upon the valve handle 10 but insulated therefrom by a strip 25, and this plate is adapted to wipe across and bridge the gap between the spaced contacts 26 that are arranged on an insulated body member 27. The body member may be fixedly supported on the valve guiding screws 28, while the valve pressure spring 29 may react to hold the bridging plate 24 upwardly against the contacts 26.

With this arrangement it will be apparent that whenever the valve 9 is shifted to cause the wiper motor to operate the pump switch 24, 26 will be closed. Therefore, the windshield cleaner will always respond to the manipulation of the control handle 10 and always at the predetermined practical speed of operation.

The pump employed as the alternate source of supply is of the highly efficient rotary type where the air displacing rotor moves continually in the same direction of rotation. As herein illustrated, the pump comprises a casing having a chamber 30 in which a rotor 31 in journaled for rotation about an eccentric axis. Radially movable impeller blades 32 slide in and out as they wipe the encircling chamber wall. The inlet passage 14 is joined by bore 33 to a recess 34 in an end wall 35 of the casing. The outlet passage 15 is likewise joined by a bore 36 to a recess 37 in such end wall. The two recesses open into the rotor chamber 30 at opposite sides of the line of tangency between the periphery of the rotor and the encircling wall of the chamber. Because of this tangential line of sealing contact, together with the sealing engagement of the blades with the chamber walls, the intake side of the pump is sealed from the exhaust side as the impeller blades move in their circular path. Consequently, when the pump is at rest, a manifold-induced air stream is prevented from flowing through the rotor chamber. Therefore, special provision is made for such manifold-induced air flow to shunt or bypass the rotor chamber. Accordingly, the inlet and outlet passages 14 and 15 are joined by a shunt passage 38 which is normally closed by a check valve 39 when the pump is functioning either predominantly or solely as the source of operating pressure, the check valve being urged to its seat through the medium of a spring 40.

From the foregoing it will appear that the windshield cleaner will always operate at a practical speed because the pump will function whenever the manifold supply is either deficient or absent, as when the engine has stopped. The pump is preferably connected to the electric motor to rotate at its high R. P. M. The degree of suction will therefore be high and may be predetermined to insure a practical cleaning speed for the wiper. It may fall short of the maximum suction developed by the manifold and would rather approximate the mean high which would ordinarily prevail at engine idling speeds. The high speed rotary pump will respond promptly to afford an adequate supply for maintaining a constant and satisfactory cleaner operation. The rotary pump with its valved shunt passage which establishes connection between the source of fluctuating suction or pressure and the windshield cleaner motor may be employed in combination with other air operated accessories on the motor vehicle and therefore the term "windshield cleaner" is used in a comprehensive sense to include other air operated accessories.

The foregoing description has been given in detail for clearness only, since the inventive principles involved are capable of assuming other physical embodiments without departing from the scope of the appended claims and the spirit of the disclosed invention.

What is claimed is:

1. A windshield cleaner system for motor vehicles in which the intake manifold of the vehicle engine serves as a source of suction, in combination, a suction operated windshield cleaner motor connected by a passage to the intake manifold for being operated by the manifold pressure influence, a suction generating pump interposed in the passage and having a chamber with a rotor therein obstructing manifold-induced airflow through the chamber, a shunt passage connecting the pump inlet to the pump outlet in by-pass relation to the rotor chamber, a check valve acting to prevent air movement from the pump outlet to the pump inlet, electrical means responding to a deficient manifold pressure influence for operating the pump, and manual control means common to the cleaner motor and the electrical means for controlling the system.

2. A windshield cleaner system for motor vehicles in which the intake manifold of the vehicle engine serves as a source of suction, in combination, a suction operated windshield cleaner motor connected by a passage to the intake manifold for being operated by the manifold pressure influence, a suction generating pump interposed in the passage and having a chamber with a rotor therein obstructing manifold-induced airflow through the chamber, a shunt passage connecting the pump inlet to the pump outlet in bypass relation to the rotor chamber, a check valve acting to prevent air movement from the pump outlet to the pump inlet, electrical means responding to a deficient manifold pressure influence for operating the pump, a valve for turning the cleaner motor on and off, a switch for controlling the operation of said electrical means, and manual means common to the valve and the switch for rendering them operative concurrently.

3. A windshield cleaner system for motor vehicles in which the intake manifold of the vehicle engine serves as a source of suction, in combination, a suction operated windshield cleaner motor connected by a passage to the intake manifold for being operated by the manifold pressure influence, a suction generating pump interposed in the passage and having a chamber with a rotor therein obstructing manifold-induced airflow through the chamber, a shunt passage connecting the pump inlet to the pump outlet in bypass relation to the rotor chamber, a check valve acting to prevent air movement from the pump outlet to the pump inlet, and control means for the suction generating pump for causing the latter to function when the manifold influence is deficient or lacking.

4. A windshield cleaner system for motor vehicles in which the power plant thereof has a source of fluctuating pressure, in combination, a fluid pressure actuated windshield cleaner connected by a passage to said source for being operated by the pressure influence, a pump interposed in the passage and having a chamber with a rotor therein obstructing normally fluid flow through the chamber, a shunt passage connecting the pump inlet to the pump outlet in bypass relation to the rotor chamber, means acting to make air flow through the shunt passage unidirectional, means responsive to the fluctuating pressure for energizing the pump when the applied pressure is insufficient, and a control for the cleaner.

5. An accessory system for motor vehicles having a source of fluctuating pressure, in combination, a pressure actuated accessory connected by a passage to the source for being operated by the pressure influence, a pressure generating pump interposed in the passage and having a chamber with a rotor therein obstructing fluid flow through the chamber, a shunt passage connecting the pump inlet to the pump outlet in bypass relation to the rotor chamber, a check valve acting to prevent fluid movement from the pump outlet to the pump inlet, electrical means responding to an insufficient pressure supply from said source for operating the pump, and manual control means for the accessory.

6. An accessory system for motor vehicles in which the intake manifold of the vehicle engine serves as a source of suction, in combination, a suction operated accessory motor connected by a passage to the intake manifold for being operated by the manifold pressure influence, a suction generating pump interposed in the passage and having a chamber with a rotor therein obstructing manifold-induced airflow through the chamber, a shunt passage connecting the pump inlet to the pump outlet in bypass relation to the rotor chamber, a check valve acting to prevent air movement from the pump outlet to the pump inlet, and control means for the suction generating pump for causing the latter to function when the manifold influence is deficient or lacking.

JOHN R. OISHEI.
ANTON RAPPL.

REFERENCES CITED

The following references are of record in the file of this patent:

UNITED STATES PATENTS

| Number | Name | Date |
| --- | --- | --- |
| Re. 20,219 | Hueber et al. | Dec. 29, 1936 |
| 1,719,134 | Roessler | July 2, 1929 |
| 1,848,754 | Lanzerotti-Spina | Mar. 8, 1932 |
| 2,245,626 | Twiss | June 17, 1941 |
| 2,379,719 | Kane | July 3, 1945 |
| 2,427,347 | Bessy | Sept. 16, 1947 |